United States Patent [19]

Jameson

[11] Patent Number: 4,756,655
[45] Date of Patent: Jul. 12, 1988

[54] MECHANICAL MANIPULATOR

[76] Inventor: John W. Jameson, 1363 University Dr., Menlo Park, Calif. 94025

[21] Appl. No.: 941,775

[22] Filed: Dec. 15, 1986

[51] Int. Cl.$^4$ ............................................. B25J 3/02
[52] U.S. Cl. ........................................ 414/2; 33/25.5; 74/491; 414/7; 414/917
[58] Field of Search ................ 414/2, 7, 917; 33/25.5; 74/491; 901/4

[56] References Cited

U.S. PATENT DOCUMENTS

| 184,493 | 11/1876 | Anderson | 33/25.5 X |
|---|---|---|---|
| 1,987,733 | 1/1935 | Dussumier de Fonbrune | 414/2 |
| 2,595,282 | 5/1952 | Monchablon | 74/471 |
| 2,988,928 | 6/1961 | Dussumier de Fonbrune et al. | 74/516 X |
| 3,128,887 | 4/1964 | Guennec et al. | 414/7 |
| 3,373,358 | 3/1968 | Wagner | 33/25.5 X |
| 3,995,746 | 12/1976 | Usagida | 414/917 X |
| 4,298,300 | 11/1981 | François et al. | 414/2 |
| 4,329,110 | 5/1982 | Schmid | 414/730 |
| 4,329,111 | 5/1982 | Schmid | 414/733 |

FOREIGN PATENT DOCUMENTS

| 1293944 | 4/1962 | France | 414/7 |
|---|---|---|---|
| 639696 | 12/1978 | U.S.S.R. | 414/2 |
| 722754 | 3/1980 | U.S.S.R. | 414/1 |
| 1038219 | 8/1983 | U.S.S.R. | 414/917 |

Primary Examiner—Robert J. Spar
Assistant Examiner—P. McCoy Smith
Attorney, Agent, or Firm—Limbach, Limbach & Sutton

[57] ABSTRACT

A manipulating mechanism is disclosed having a control handle adapted to be positioned freely in three dimensions, a fixture for supporting a tool to be positioned, a linkage system which causes the end of the tool to move in the same direction as the control handle and a support structure. The linkage system includes a first linkage connected between the control handle and an effective ball-and-socket joint and a second linkage connected between the effective ball and socket joint and the fixture. Each linkage includes four link members rotatably connected in a parallelogram and a gimbal connected to one of the link members for mounting the linkage from the support structure.

2 Claims, 7 Drawing Sheets

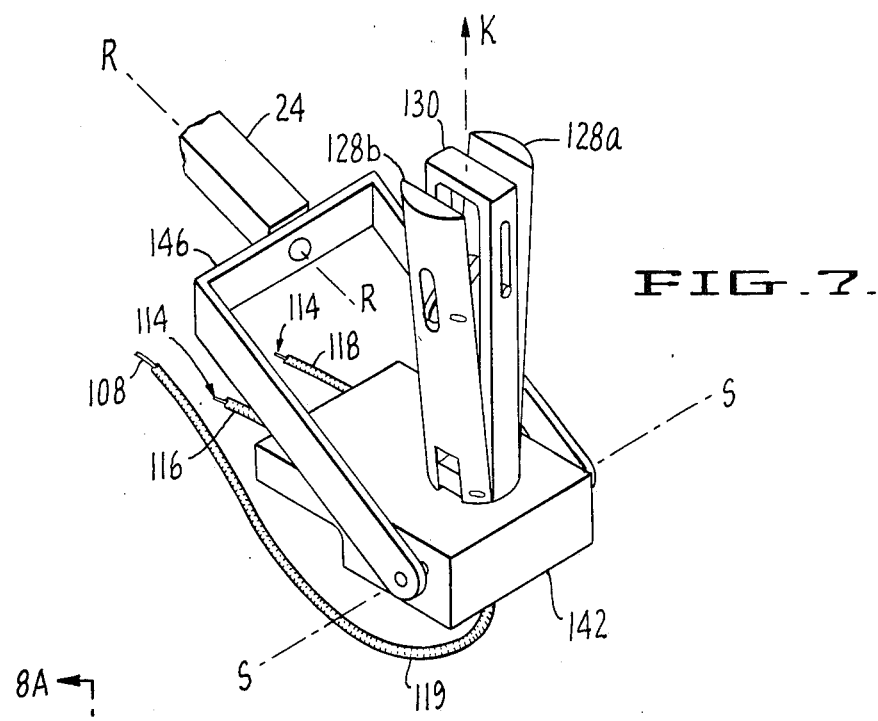
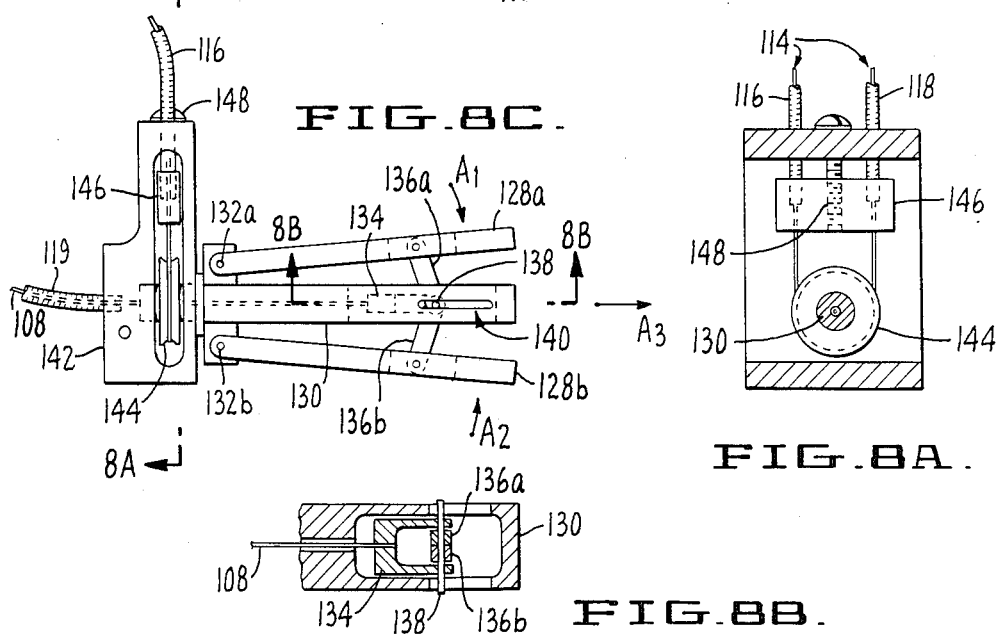

MECHANICAL MANIPULATOR

This invention relates generally to mechanical manipulators which control the fine motions of an object in response to similarly directed, but typically scaled, motions of a control handle.

BACKGROUND OF THE INVENTION

This invention relates to manipulators and, in particular, to those that can finely position an object in three dimensions in response to motions induced upon a control handle, whereby the motion of the object follows that of the induced motion, and typically scaled. In a preferred application, this invention deals with micromanipulators which employ two three-dimensional motion translation mechanisms connected in series by a ball-and-socket joint and mounted to a common support structure.

Manipulators and micromanipulators have been made in the past which incorporate electrical, pneumatic, hydraulic, as well as purely mechanical actuation means.

SUMMARY OF THE INVENTION

Broadly stated, this invention is directed to a manipulating mechanism having a control handle adapted to be positioned freely in three dimensions, a fixture for supporting a tool to be positioned, a linkage system which causes the end of the tool to move in the same direction as the control handle and a support structure. The linkage system includes a first linkage connected between the control handle and a joint and a second linkage connected between the first linkage and the fixture. In the preferred embodiments, the linkage system is comprised of two motion translation mechanisms connected in series through an effective ball-and-socket joint, where each translation mechanism is essentially a pantograph adapted for rotation with respect to the support structure about two perpendicular axes. The motion of the control handle induces oppositely (or similarly, depending on the embodiment) directed motion of the ball-and-socket joint by means of one translation mechanism which in turn causes similarly directed motion of the tool by means of the second translation mechanism so that the motion of the tool is in the same direction as the motion of the control handle.

In accordance with one specific aspect of the present invention at least one of the linkages produces a scaled motion so that the resulting motion of the tool is scaled relative to the motion applied to the control handle. Typically for a micromanipulator, there is a reduction in motion accomplished through at least one of the linkages.

In accordance with the preferred embodiment, each linkage includes four link members rotatably connected in a parallelogram and a gimbal connected to one of the link members for mounting the linkage from the support structure.

In accordance with still another aspect of the present invention, the control handle includes a ball and socket to impart motion to the first linkage means so as to enable the freest three dimensional motion of the tool responsive to motion applied to the control handle.

In accordance with still another aspect of the present invention, the manipulation apparatus includes duplicate manipulation systems each with a control handle connected to a first linkage which is in turn connected to an effective ball and socket joint which is in turn connected to another linkage to the tool supporting structure. With this dual system, orientation control can be accomplished of the tool.

In accordance with still another aspect of the present invention, rotational motion at the control handle of the manipulative apparatus is translated into rotational motion of the tool.

In accordance with still another aspect of the present invention gripping means is provided for the tool and the control handle is provided with means for producing gripping motion with the gripping means.

These features and advantages of the present invention will become more apparent upon a perusal of the following specification taken in conjunction with the accompanying drawings wherein the similar characters of reference referred to similar parts in each of the several views.

DESCRIPTIONS OF THE DRAWINGS

Figure 1:
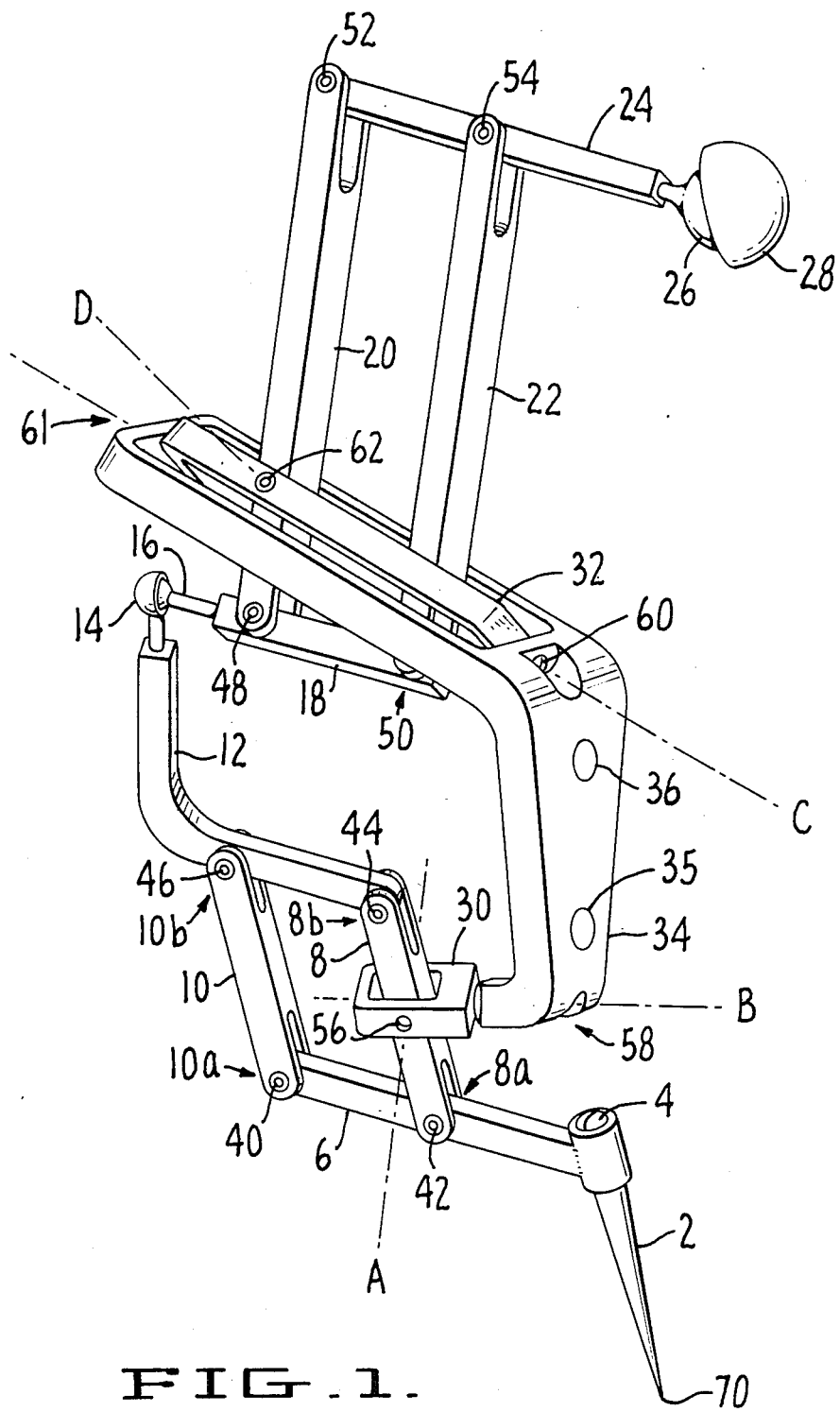
FIG. 1 is a perspective view of a micromanipulator made according to the present invention.
Figure 2:
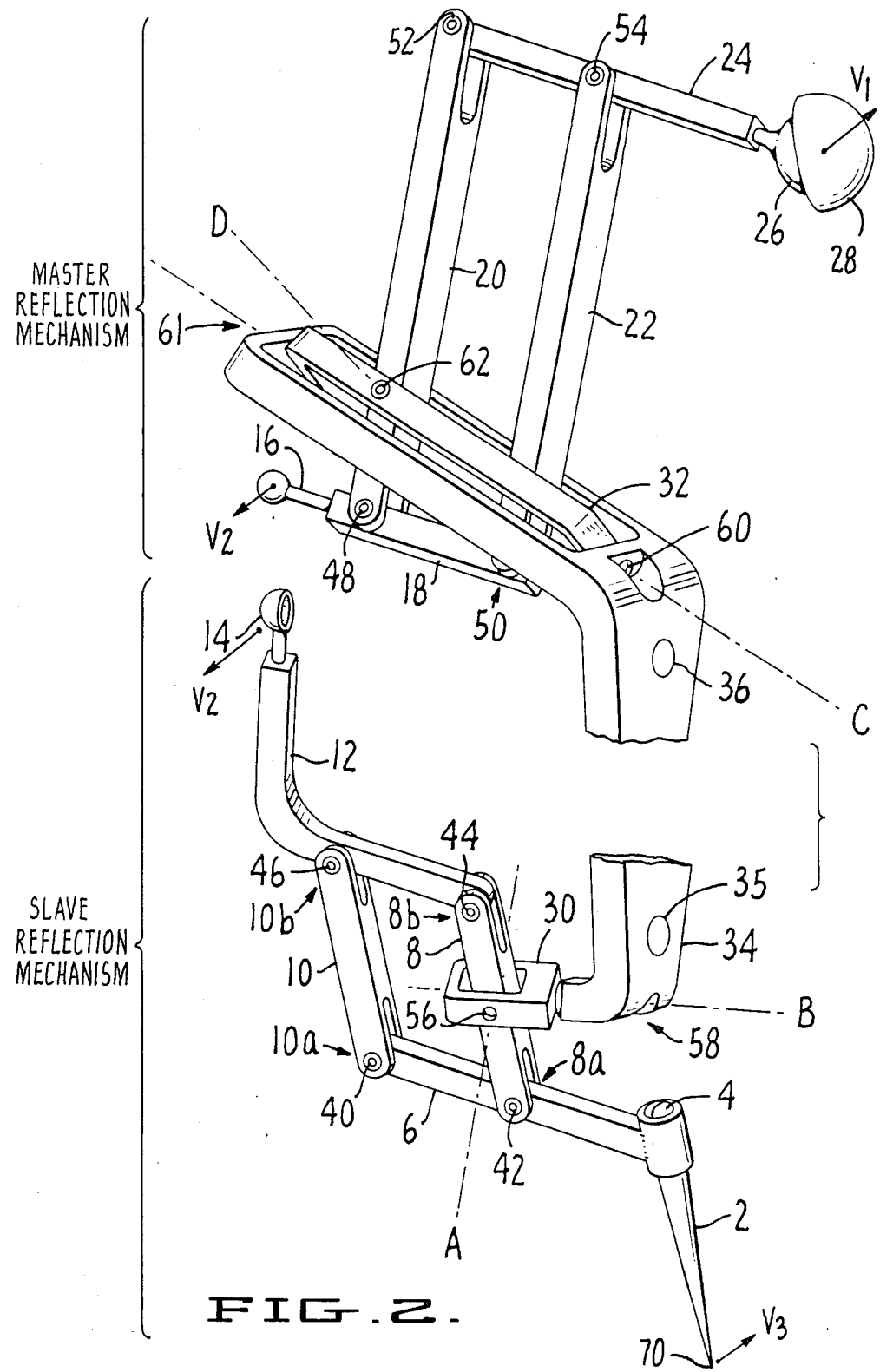
FIG. 2 is similar to FIG. 1 except that the micromanipulator is split in half to reveal its operating principle.
Figure 5:
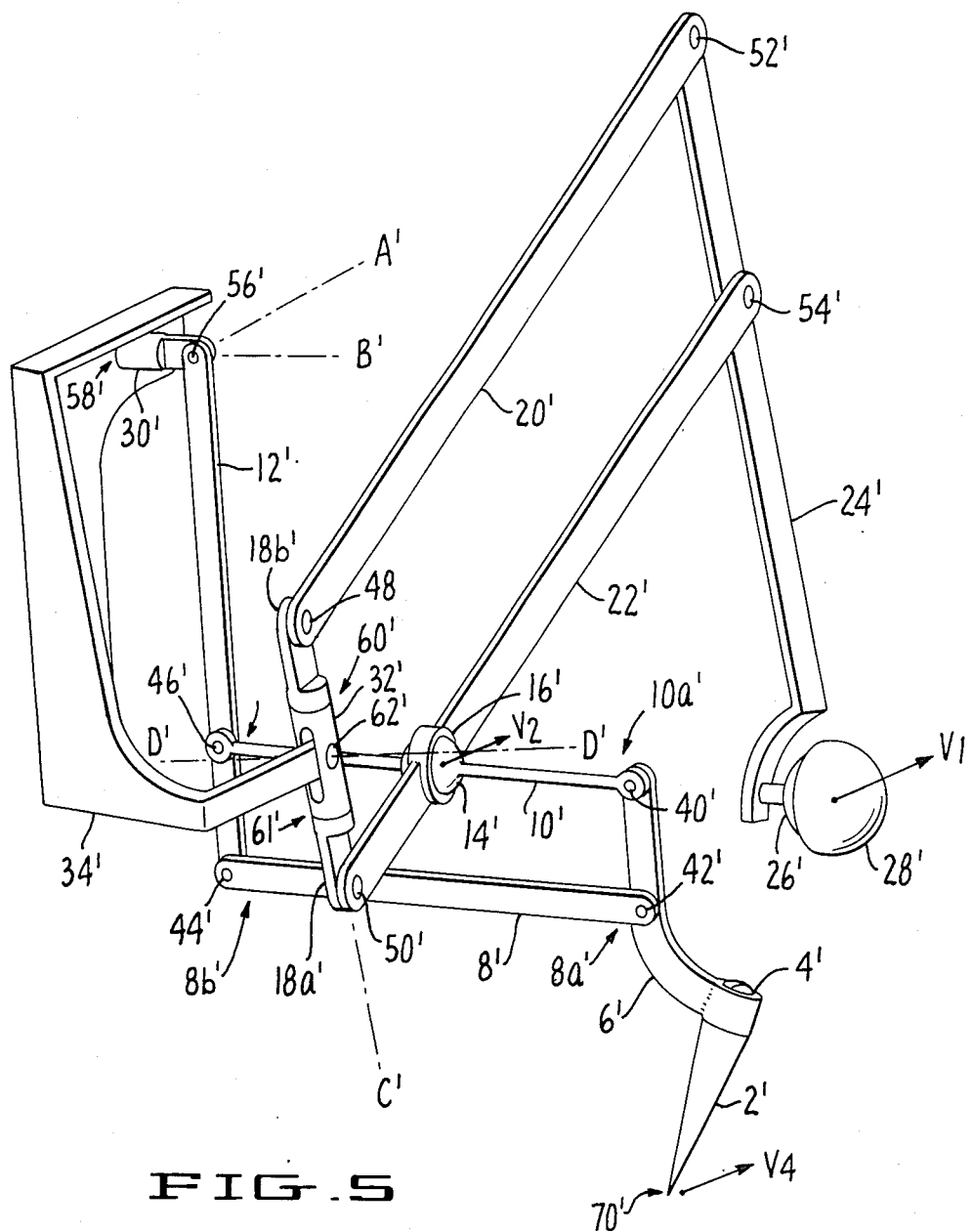
FIG. 5 is a perspective view of another embodiment made according to the present invention.
Figure 6A:
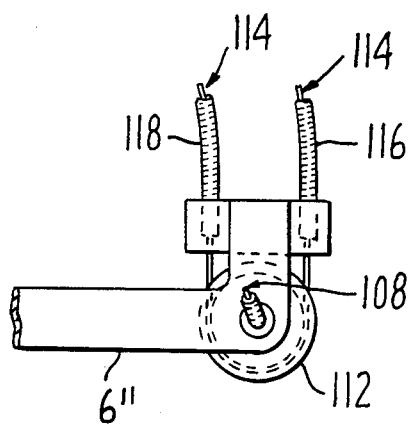
Figure 6B:
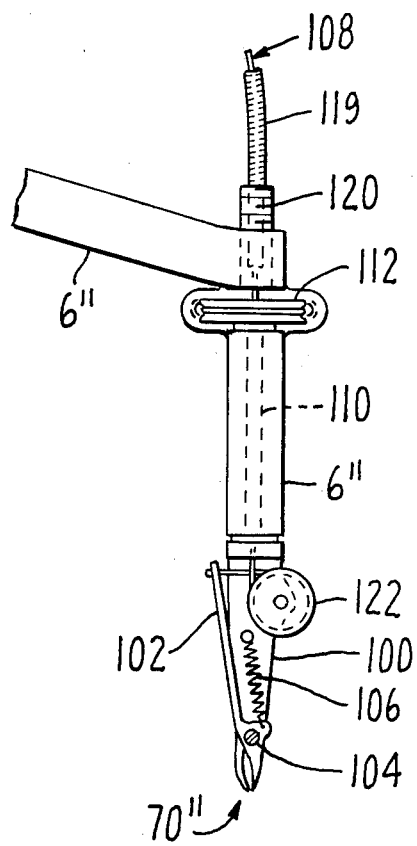
Figure 6C:
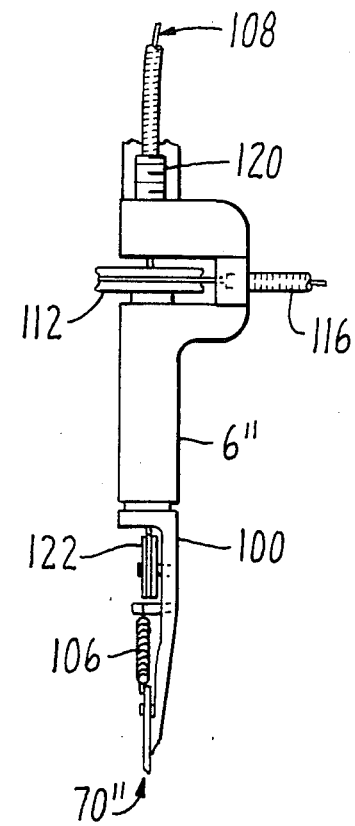

FIGS. 6A-C are a set of orthographic views of a tool, intended to replace the tool of FIGS. 1-2 or 5, which, when used in conjunction with the control handle of FIGS. 7-8, is capable of controlled rotation about a single axis as well as controlled grasping.

FIG. 7 is a perspective view of an apparatus for imparting the gripping and rotary action of the tool shown in FIG. 6.

FIGS. 8A-C are a set of three orthographic views of the apparatus shown in FIG. 7.

Figure 9:
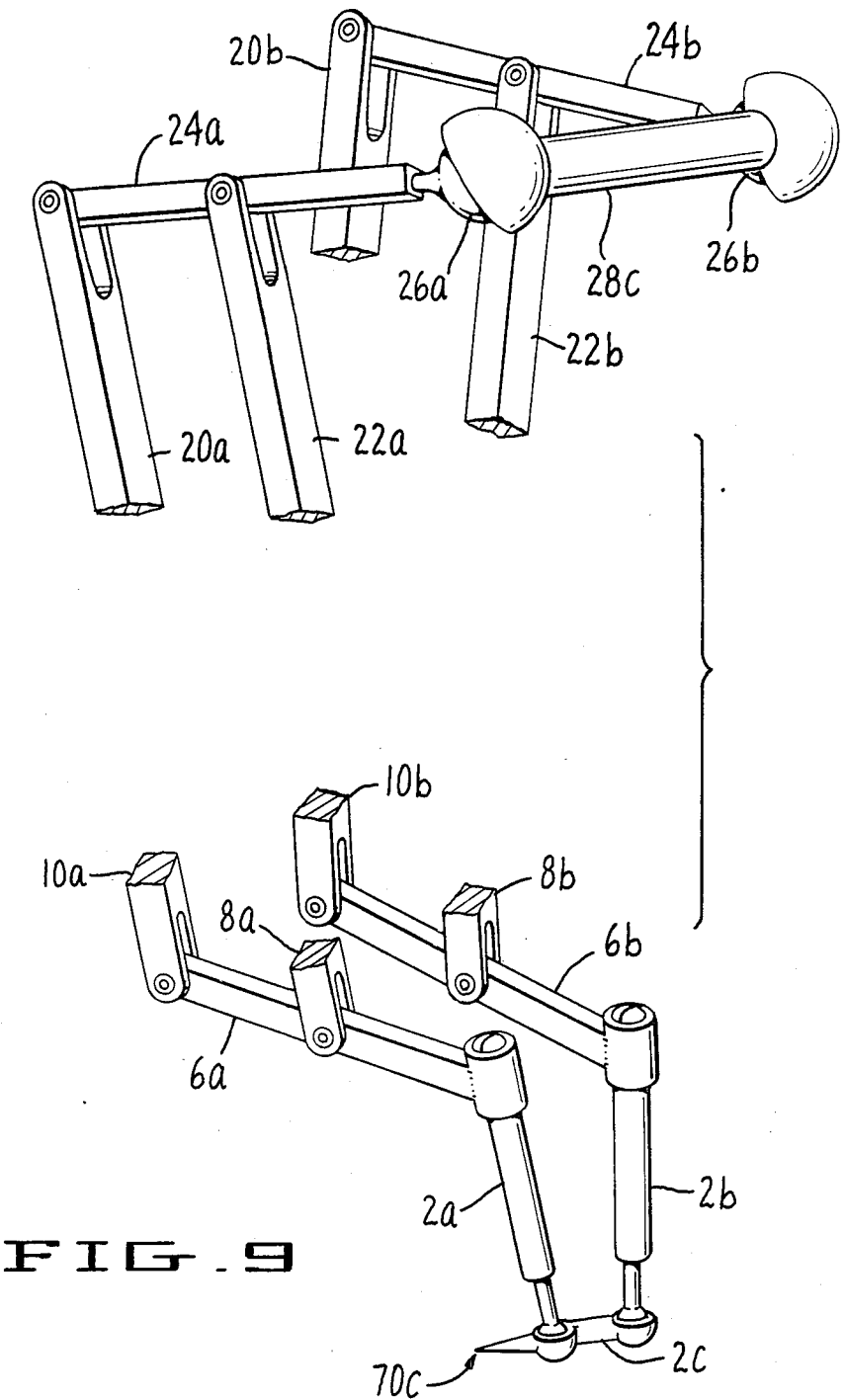

FIG. 9 is a perspective view showing how two micromanipulators similar to the embodiment of FIG. 1 or FIG. 5 can be implemented for orienting, as well as positioning, a tool.

DESCRIPTION OF PREFERRED EMBODIMENTS

One of the preferred practical embodiment of the present invention is illustrated in FIGS. 1-2. A housing 34 supports a gimbal 30 by means of a rotatable joint 58 having a rotational axis along line B. The housing 34 also supports another gimbal 32 by means of rotatable joints 60 and 61 having a rotational axis along line C. The housing 34 has two holes 35 and 36 for affixing housing 34 to a supporting device (not shown) such as a stand with a heavy base, or a bracket for attachment to a microscope.

The gimbal 30 supports the slave reflection mechanism comprised of elements 2-14, by means of a joint 56 which rotatably connects a link member 8 to gimbal 30 with the corresponding rotation about an axis along line A which, intersects line B. The gimbal 32 supports the master reflection mechanism (which is the master translation mechanism for this embodiment) comprised of elements 16-28, by means of a joint 62 which rotatably connects link member 20 to gimbal 32 with the corresponding rotation about an axis along line D which intersects line C.

The probe 2, which is the tool for the embodiment of FIGS. 1-2, is affixed to a support link member 6 by means of attachment screw 4. Member 6 is rotatably connected to a first end 8a of link 8 and to a first end 10a of a parallel link member 10 by joints 40 and 42, respectively. The second ends 8b and 10b of links 8 and 10, respectively, are in turn, rotatably connected to a support link 12 by joints 44 and 46, respectively. The rotation axes of the joints 40-46 are all parallel to the line A. A ball-and-socket joint 14-16 is comprised of the socket member 14 which is affixed to the support link 12 of the slave reflection mechanism and the ball member 16, which is affixed to a support link 18 of the master mechanism.

The control handle 26-28 is formed of a ball-and-socket joint with the ball member 26 affixed to a link 24 and a socket member 28 surrounding the ball 26 for gripping and application of the force, direction and velocity desired. Support link 24 is rotatably connected to links 20 and 22 by joints 52 and 54, respectively. Links 20 and 22, in turn, are rotatably connected to support link 18 by joints 48 and 50. Links 18, 20, 22 and 24 form a parallelogram, and the rotational axes of said joint 48-54 are all parallel to the line D.

It is understood that, in the following discussion, the velocities and positions ascribed to various parts of the micromanipulator embodiment actually refer to idealized points. When a position or velocity is ascribed to a ball or socket member, the reference is actually made to the center of rotation the corresponding ball or socket members.

The micromanipulator is operated simply by moving the control handle socket 28 with the hand, which results in similarly directed motion of the probe tip 70, but with a reduced scale of motion. For the embodiment shown in FIGS. 1-2, the motion reduction is four to one.

To define the necessary geometry of the linkage system for the operation, it is useful to refer to FIG. 2. This figure shows the embodiment of FIG. 1 split in half indicating the slave reflection mechanism, comprised of link elements 2-14, gimbal 30, and the associated rotatable joints 40-46, 56 and 58, and the master reflection mechanism comprised of link elements 16-28, gimbal 32, and the associated rotatable joints 48-54, 60 and 62.

Considering first the master reflection mechanism in FIG. 2 and with gimbal 32 held stationary, the motion of control handle 28 is restricted to a plane and results in oppositely directed motion of the ball portion 16 of the ball and socket member 14-16 since members 18 and 24 are kept parallel by links 20 and 22 and since the ball portion of ball member 16 is diametrically opposed to the ball portion of ball member 26 about joint 62. On the other hand, if gimbal 32 is allowed to move but rotatable joints 48-54 and 62 are fixed, then motion of control handle 28 results in oppositely directed motion of the ball portion of ball member 16 because the axis of joint 60 (line C), the ball portion of ball member 26, and the control handle 26-28 are contained by one plane. Hence, when rotatable joints 48-54 and 62 are not fixed and gimbal 32 is rotatable with respect to the housing 34, as is the case for normal operation, then motion of control handle socket 28 results in oppositely directed motion of the ball portion of ball member 16, as indicated in FIG. 2. The ratio of the distance between the ball portion of ball member 16 and of ball member 26 and to the distance between said ball portion of ball member 26 and joint 62 is equal to the ratio of motion reduction for the oppositely directed motions, which, for the embodiments of FIGS. 1 and 2, is four to one.

The slave reflection mechanism has the same motion properties as the master mechanism in that the motion of one endpoint, in this case the probe tip 70, is directed oppositely to the motion of its diametrically opposed (about joint 56) endpoint, in this case the socket portion of socket member 14. For the embodiment of FIGS. 1 and 2, the ratio of motion reduction is one to one for the slave reflection mechanism S, i.e., the motion of the said endpoints are oppositely directed, but of the same magnitude.

The operating principle of the micromanipulator embodiment of FIG. 1 can now be completely described in conjunction with FIG. 2, where velocities are represented in direction and magnitude by arrows labelled v1, v2 and v3. If the control handle 28 is moved with the velocity v1 indicated by the arrow in FIG. 2, then the velocity v2 of the ball portion of member 16 is in the opposite direction of v1 and reduced in magnitude by a factor of four, according to the said operating principle of the master reflection mechanism. This, in turn, moves the socket portion of member 14 with velocity v2, which in turn, causes the probe tip 70 to move with velocity v3, which is in the opposite direction of v2, but at the same magnitude, according to the said operating principle of the slave reflection mechanism. Hence, v3 is in the same direction as v1, except with a magnitude reduction of four to one.

Figure 3:
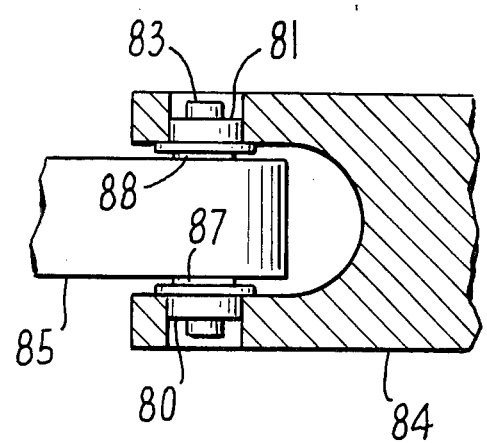
FIG. 3 is a sectional view of a typical joint connecting two linkages, illustrating the method for reducing backlash.

In order to provide accurate and fluid control of the probe tip 70 via the control handle 28, it is necessary to minimize the play and friction associated with all the rotatable joints. For the embodiment of FIG. 1, this is accomplished according to the following description taken in conjunction with FIG. 3, which shows a sectional view of a typical rotatable joint connecting two typical members 84, 85. Two flanged ball bearings 80 and 81 are mounted on the wide member 84 with the bearing flanges on the inward side of the two projections of the member 84. Shaft 83 is affixed to member 85, and shims 87 and 88 contact the inner races of their adjacent ball bearings as well as member 85. The width of the gap between said protrusions of said member 84 is such that, due to the resilience of the said protrusions, an outward acting thrust load is maintained on both bearings, minimizing the play associated with the rotatable joint.

To further improve the accuracy and fluidity of motion control of the probe tip 70, it is also desirable to minimize the friction and play associated with the ball and socket members 14, 16, 26 and 28—especially for members 14 and 16. Hence, it is desirable that the socket members be constructed of a low friction material such as teflon (or lined with such a material), and that the ball member have a polished metal surface. Furthermore, the relative dimensions of the ball and socket members should be such that the ball member is in slight compression with the socket member, in order to eliminate play. These devices are widely available on the market.

Figure 4:
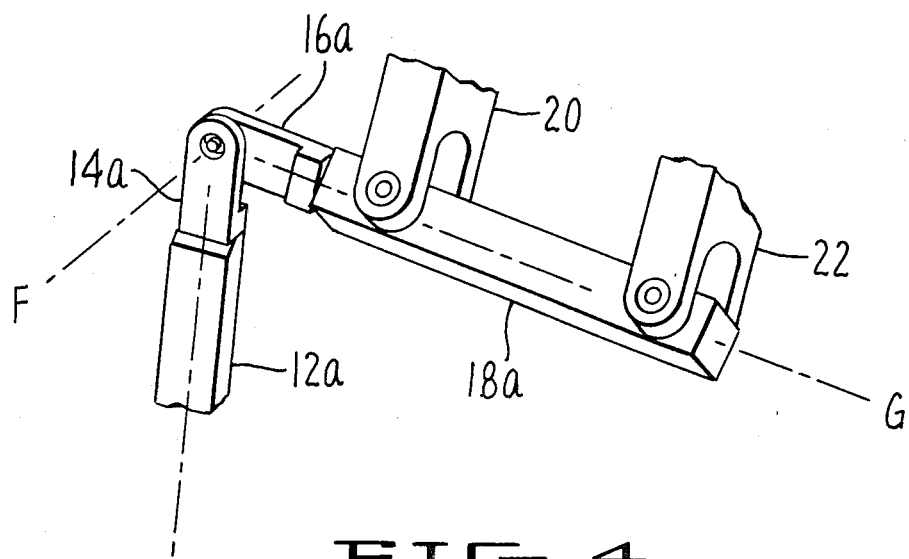
FIG. 4 is a perspective view of an alternative to the ball-and-socket joint used in the embodiment of FIG. 1.

An effective ball and socket joint alternative to the ball-and-socket joint associated with members 12, 14, 16 and 18 is the arrangement shown in FIG. 4, which is a perspective drawing, somewhat enlarged, of the part of the micromanipulator affected by the alternate arrangement. Link member 12a, which replaces link member 12 of FIG. 1, is rotatably connected to a clasp 14a with the corresponding rotation axis along line E. Clasp 12a is rotatably connected to clasp 16a with the corresponding rotation axis along line F, and link member 18a, which replaces link member 18 of FIG. 1, is rotatably connected to clasp 16a with the corresponding rotation axis along line G. The essential requirement of the this alternate arrangement is that lines E, F and G intersect at a point, which corresponds to the center of the ball-and-socket joint in the embodiment of FIG. 1.

Another preferred embodiment of a manipulator made according to the present invention is shown in perspective in FIG. 5. Note that the description for this embodiment is similar to that for the previous embodiment so that similar, but primed, reference numbers are used.

A housing 34' supports a gimbal 30' by means of a rotatable joint 58' having a rotational axis along line B'. The housing also supports another gimbal 32' by means of rotatable joint 60' having a rotational axis along line C'. The gimbal 30' supports the slave follower mechanism, comprised of elements 2'-14', by means of joint 56' which rotatably connects a link member 12' to gimbal 30' with the corresponding rotation about an axis along line A' which intersects line B'. The gimbal 32' supports the master follower mechanism, comprised of elements 16'-28' by means of joints 62' with the corresponding rotation axes along line D'.

The probe 2', which is the tool for the embodiment of FIG. 5, is affixed to a support link member 6, by means of attachment screw 4'. Member 6' is rotatably connected to a first end 8a' of link 8' and to a first end 10a' of a parallel link member 10' by joints 42' and 40', respectively. The second ends 8b' and 10b' of links 8' and 10', respectively, are in turn rotatably connected to support link 12' by joints 44' and 46', respectively. The rotation axes of the joints 40'-46' are all parallel to the line A'. A ball-and-socket joint 14'-16' is comprised of the socket member 16' which is affixed to the support link 22' of the master follower mechanism, and the ball member 14', which is affixed to a support member 10' of the slave follower mechanism. (The ball member 14' could be a socket member in which case the socket member 16' would be a ball member corresponding closer to the construction of FIGS. 1-2.)

The control handle 26'-28' is formed of a ball-and-socket joint with the ball member 26' affixed to a link 24' and a socket member 28' surrounding the ball 26'. Support link 24' is rotatably connected to links 20' and 22' by joints 52' and 54', respectively. Links 20' and 22', in turn, are rotatably connected to link member 18' by joints 48' and 50', respectively. Links 18', 20', 22' and 24' form a parallelogram, and the rotational axes of the joints 48'-54' are all parallel to the line D'.

As with the embodiment of FIG. 1, the embodiment of FIG. 5 is operated by moving the control handle 26'-28' with the hand, which results in similarly directed motion of the probe tip 70', but with a reduced scale of motion. For the embodiment shown in FIG. 5 the motion reduction is two to one.

Considering presently the master follower mechanism in FIG. 5, if joint 60' is fixed, then the motion of control handle 28' is restricted to a plane and results in similarly directed motion of the socket member 16' because of the parallelogram structure of the link members 18'-24' and because the socket member 16' is on a line connecting joint 62' with the control handle socket 28'. On the other hand, if joints 60' and 61' are allowed to move but rotatable joints 48'-54' and 62' are fixed, then motion of control handle socket 28' results in similarly directed motion of the socket member 16' because the axis of joint 60' (line C'), socket member 16', and the control handle 26'-28', are contained in one plane. Hence, when rotatable joints 48'-54' and 60'-62' are not fixed, as is the case for normal operation, then motion of said control handle socket 28' results in similarly directed motion of socket member 16', as indicated in FIG. 5. The ratio of the distance between the socket member 16' and control handle socket 28' to the distance between said socket member 16' and joint 62' is equal to the ratio of motion reduction for similarly directed motions, which, for the embodiment of FIG. 5, is four to one.

The slave follower mechanism has the same motion properties as the master follower mechanism in that the motion of one point, in this case the probe tip 70', is in the same direction as the motion of another point, in the case the (center of the) ball member 14'. However, note that the motion of tip 70' is enlarged by a factor of two with respect to the ball member 14' for the embodiment of FIG. 5.

The operating principle of the micromanipulator embodiment of FIG. 5 can now be completely described. If the control handle 28' is moved with the velocity v1 indicated by the arrow in FIG. 5, then the velocity v2 of the socket member 16' is in the same direction as v1 but reduced in magnitude by a factor of four, according to the operating principle of the master follower mechanism. This, in turn, moves the ball member 14' with velocity v2, which, in turn, causes the probe tip 70' to move with velocity v4, which is in the same direction as v2, but at twice the magnitude, according to the operating principle of the slave follower mechanism. Hence, v4 is in the same direction as v1, except with a magnitude reduction of two to one.

It is easily observable that other embodiments of the present invention may be constructed which have different motion reduction or enlargement ratios.

Other more elaborate tools may be used to replace the probe 2 (or 2') and control handles 26-28 (or 26'-28'), where the form of the control members depends on the form of the corresponding tool. For example, a tool could be constructed which is rotatable about an axis which intersects the slave point with the tool being rotatably controlled by a suitably constructed control mechanism (to replace members 26-28 or 26'-28') in combination with a suitable drive means such as sheathed flexible cable, hydraulic, pneumatic, or electrically powered systems. The tool could also have interconnected movable portions to allow for gripping of objects, the gripping action also being controlled by the suitable control mechanism. For example, a preferred embodiment of such a tool, presently denoted as the "enhanced tool", is shown in FIGS. 6-8, which is now described.

FIGS. 6A-C show three orthographic views of the preferred embodiment of the enhanced tool which has a gripper device and a means for rotation of the gripper device about one axis. Gripping capability is provided by the scissor-like configuration of the base grip element 100 and the movable grip element 102, the latter being rotatable with respect to the former about joint 104. The gripping surfaces of the said grip elements are at the tool tip location (70") and are kept separated by the pull of the extension spring 106, unless this pull is overcome by the force of the flexible cable 108 acting at one end of the movable grip element.

The base grip element 100, a tube 110, and a pulley 112 are rigidly affixed to one another and are rotatable with respect to the modified support link member 6" about the long axis of the tube 110, where that long axis intersects the tool tip location. Rotation of the pulley 112, and hence the gripper device, is affected from the enhanced control mechanism discussed below via the cable drive system, the latter consisting of the flexible stranded cable 114 surrounded by, and movable with respect to, flexible sheathes 116, 118 of one of the commercially available types. Note that sheaths 116 and 118 are rigidly affixed to support member 6", that the stranded cable 114 can move freely with respect to the said support member, and that cable 114 is wrapped around the pulley several times to gain sufficient friction to turn the pulley.

The gripper device is operated from the control mechanism by a flexible drive system comprised of the sheath 118 and cable 108. Sheath 118 is rotatable with respect to member 120, and the latter member is threaded into the support member 6", allowing for position adjustment of cable 108. Note that cable 108 passes from the sheath through the center of pulley 112, along the central axis of the said tube member, then around pulley 122, and is finally affixed to member 102. Also note that, because cable 108 passes along the rotation axis, the position of the grip elements is not affected by rotation of the gripper device about the said central axis.

The control mechanism used to control the aforementioned gripper device, presently denoted as the "enhanced control mechanism", is shown in perspective view in FIG. 7 and in orthographic views in FIGS. 8A–C. The control members 128a and 128b are rotatable with respect to the guide member 130 about joints 132a and 132b respectively. When the control members 128a and 128b are brought together (in the direction of arrows A1 and A2 in FIG. 8C), yolk 134 is caused to move in the direction of arrow A3 due to the interconnection between it and the control members 128a and 128b via the link members 136a and 136b. The orientation of the control members is kept symmetrical with respect to guide member 130 since joint 138 is constrained to follow slot 140 in guide member 130. Note that yolk 134 is affixed to the end of the stranded cable 108 and the latter is freely movable with respect to guide member 130 and support member 142. The cable sheath 119 is affixed to support member 142 and routes cable 108 to the said enhanced tool. Hence, squeezing the control members 128a and 128b causes the grip elements of the enhanced tool to close. When the control handles are released, spring 106 provides the restoring force to bring the control handles to their original position. Note that the motion of cable 108 due to the squeezing of the control handles is more than that required to close the gripping elements, but that the corresponding extra motion of the cable is accommodated by the flexibility of the long, slender portion of grip element 102.

The guide member 130 is rigidly affixed to a pulley 144 and both are rotatable with respect to support member 142 about axis K. The stranded cable 114 is wrapped around pulley 144 and is routed to the enhanced tool via sheaths 116 and 118, and causes rotation of the gripper elements 100 and 102 (about the central axis of tube 110) in response to rotation of guide member 130. Rotation of the guide member does not affect the position of cable 108 since it passes along the corresponding rotation axis. Also, sheaths 116 and 118 are affixed to block member 146 but are movable with respect to support member 142. Furthermore, screw 148 is threaded into block member 146 but is freely rotatable with respect to support member 142. Hence, the tension of the cable 114 on pulleys 112 and 144 is adjusted by rotation of the screw 148.

Support member 142 is mounted to member 24 (or 24') of the manipulator via the gimbal yolk 146, the latter being rotatable with respect to support member 142 about axis S and rotatable with respect to member 24 about axis R (see FIG. 7). This allows the operator to find the most comfortable position of the control handle for operation of the manipulator.

Other more elaborate manipulators, presently called tandem micromanipulators, may be constructed which control the orientation, as well as position, of a tool (or object) by incorporating two or more constituent micromanipulators made according to the present invention. For example, a tandem micromanipulator could sufficiently control the orientation of an axisymmetric tool which uses two constituent micromanipulators, as illustrated in FIG. 9. A cylindrical control bar 28c is attached to the constituent micromanipulators by means of ball-and-socket joints formed by the socket portions of the two ends of the control bar in combination with the ball portions of members 26a and 26b, where the symmetry axis of cylindrical portion of the control bar passes through the master endpoints of the respective constituent micromanipulators. A probe member 2c with socket portions has similar attachments corresponding to the (two) slave points, where members 2a, 2b replace tool 2 (or 2') of the embodiment of FIG. 1 (or FIG. 5). The members 2a and 2b are affixed to members 6a and 6b, respectively, and have ball portions which rotatably connect to said socket portions of probe member 2c. It is necessary that the ratio of the distance between the master endpoints to the distance between the slave endpoints be the same as the motion reduction ratio for the constituent micromanipulators, and that the housings (corresponding to member 34 of FIG. 1 or member 34' of FIG. 5) of the constituent micromanipulators be affixed to a common support member (not shown in FIG. 1) such that the symmetry axes of the cylindrical portions of said probe and tool members are parallel when the latter are connected to the endpoints of the constituent micromanipulators. When the housings are affixed and the probe and control members are connected in the manner described and illustrated, the symmetry axes will remain parallel for all other attainable positions and orientations of the control member, and hence the orientation of the probe member is controlled by orienting the long axis of the control member.

What is claimed is:
1. A manipulator apparatus comprising
    a control handle adapted to be positioned freely in three dimensions,
    a fixture for supporting a tool to be positioned by movement of said control handle,
    a joint means comprising an effective ball and socket joint means,
    a first linkage means connected between said joint means and said control handle for moving said effective ball and socket joint means in three dimensions responsive to movement of said control handle and with the effective ball and socket joint means moving in a direction opposite to the direction of said control handle, and a second linkage means connected between said first linkage means and said fixture for moving said fixture to move the tool in three dimensions responsive to movement of said effective ball and socket joint means and with the tool moving in a direction opposite the direction of said effective ball and socket joint means and in a direction the same as the direction of said control handle, each of said first and second linkage means including four link members rotatably connected in a parallelogram and a gimbal connected to one of said link members for mounting said linkage means from a support housing.

2. A manipulator apparatus comprising
a control handle adapted to be positioned freely in three dimensions,
a fixture for supporting a tool to be positioned by movement of said control handle,
an effective ball and socket joint means,
a first linkage means connected between said control handle and said effective ball and socket joint means for moving said effective ball and socket joint means in three dimensions responsive to movement of said control handle and with said effective ball and socket joint means moving in a direction opposite to the direction of said control handle, a second linkage means connected between said effective ball and socket joint means and said fixture for moving said fixture to move the tool in three dimensions responsive to movement of said effective ball and socket joint means and with the tool moving in a direction opposite the direction of said effective ball and socket joint means and in a direction the same as the direction of said control handle, each of said first and second linkage means including four link members rotatably connected in a parallelogram and a gimbal connected to one of said link members for mounting said linkage means from a support housing.

* * * * *